G. H. PETRI.
DOUGH FORMING MACHINE.
APPLICATION FILED OCT. 25, 1917.

1,355,908.

Patented Oct. 19, 1920.

INVENTOR
GUNTHER H. PETRI
BY Mitchell, Chadwick & Kent
ATTYS.

INVENTOR
GUNTHER H. PETRI

G. H. PETRI.
DOUGH FORMING MACHINE.
APPLICATION FILED OCT. 25, 1917.
1,355,908.
Patented Oct. 19, 1920.
4 SHEETS—SHEET 3.
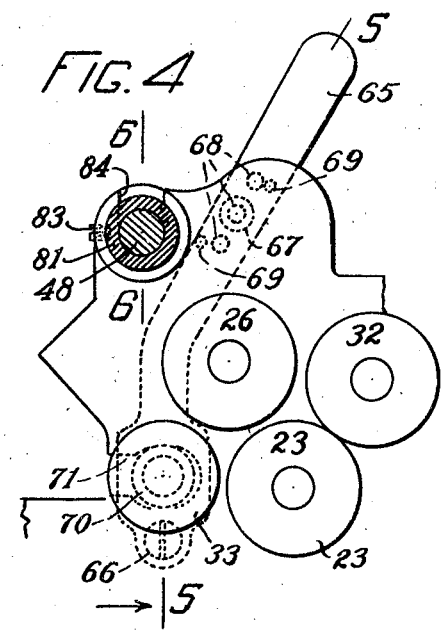
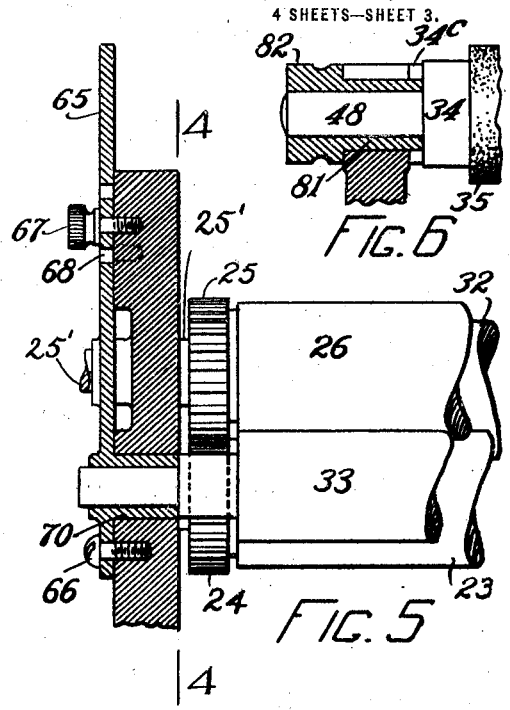
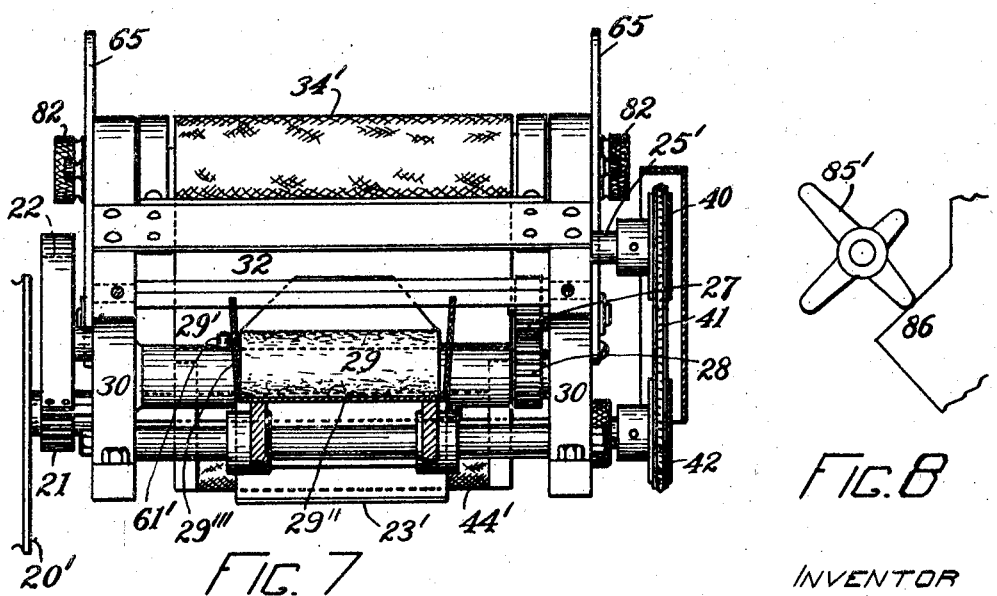
INVENTOR
GUNTHER H. PETRI
BY Mitchell, Chadwick & Kent
ATTYS.

G. H. PETRI.
DOUGH FORMING MACHINE.
APPLICATION FILED OCT. 25, 1917.

1,355,908.

Patented Oct. 19, 1920.
4 SHEETS—SHEET 4.

INVENTOR
GUNTHER H. PETRI
BY
Mitchell, Chadwick & Kent
ATTYS.

UNITED STATES PATENT OFFICE.

GUNTHER H. PETRI, OF BROOKLINE, MASSACHUSETTS, ASSIGNOR TO PETRI AND JONES COMPANY, INC., OF BOSTON, MASSACHUSETTS, A CORPORATION OF MASSACHUSETTS.

DOUGH-FORMING MACHINE.

1,355,908.   Specification of Letters Patent.   Patented Oct. 19, 1920.

Application filed October 25, 1917.   Serial No. 198,536.

*To all whom it may concern:*

Be it known that I, GUNTHER H. PETRI, a citizen of the United States, residing at Brookline, in the county of Norfolk and State of Massachusetts, have invented new and useful Improvements in Dough-Forming Machines, of which the following is a specification.

This invention relates to improvements in dough forming machines. More particularly it relates to apparatus for forming dough into shape for making crescent rolls, salt sticks, French bread and the like, in which a sheet of dough is rolled upon itself and so curled or wound into the form of a stick. For crescent rolls such a stick is made with the bulging middle portion, tapering toward the ends, and can then be bent into the crescent shape by hand as the workman picks it up to lay on baking pans, or otherwise. It is the object of the invention to provide apparatus which will take a ball or disk of dough substantially as coming from between proof boards and convert it into the stick form specified. It is also the object of the invention to provide the various automatic actions and mechanical movements that are incidental to attaining that purpose, with means for adjusting them and means for conveniently moving the apparatus about the shop for use in different localities, also to hold a tray to receive the product when in use and to reduce into less space when not in use, by pushing in of the tray holder. The balls of dough which come from the rounding machine undergo a special preparatory treatment incidental to the treatment by the winding mechanism. This deforms them somewhat by flattening and renders their opposite sides respectively adhesive and non-adhesive, in a relative sense.

Acting upon dough thus prepared, the mechanism engages one edge of the disk and draws out the mass, thinning it to a predetermined degree, winding the dough upon itself in spiral form, and delivering it thus rolled together. Variations may be made in the specific design and arrangement of mechanism shown without departing from the scope of the invention. It is intended that the patent shall cover by suitable expression in the appended claims whatever features of patentable novelty exist in the invention disclosed. In the accompanying drawings, which may be regarded as expressing a preferred form of embodiment of the invention:

Fig. 4 is a side elevation showing certain details on a still larger scale, as if in section on the line 4—4 of Fig. 5, but with the positions of the cutaway rolls represented as if the rolls were present;

Fig. 5 is a front elevation of the same in section on the line 5—5 of Fig. 4;

Fig. 6 is a front elevation of a detail of Fig. 4 in section on the line 6—6, enlarged;

Fig. 7 is a rear elevation of the top of the machine, in section on the line 7—7 of Fig. 3;

Fig. 8 is a side elevation of a modified detail of certain of the adjusting mechanism;

Figure 1:
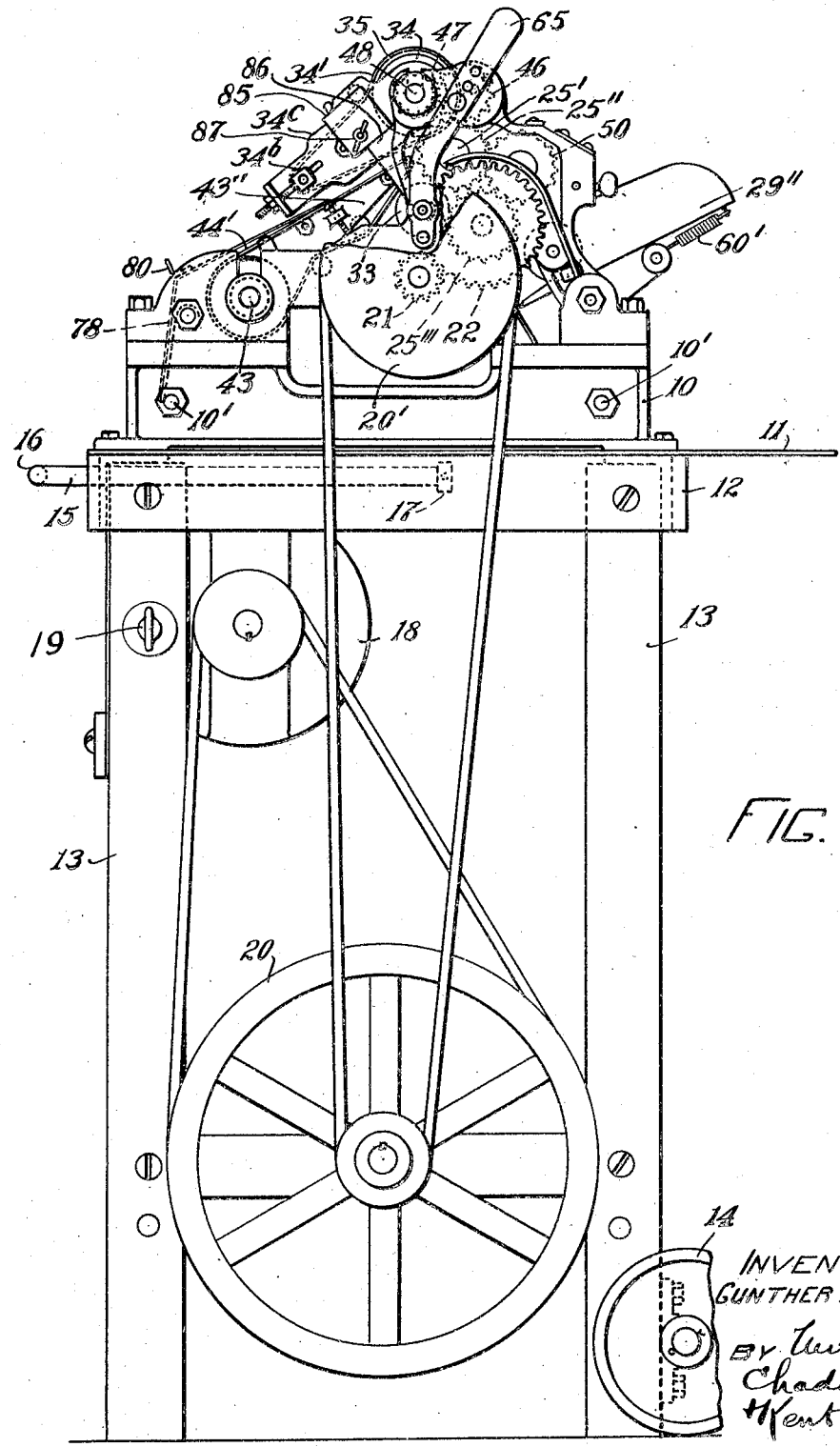
Figure 1 is a side elevation showing the winding machine as a whole, without the said device for preparatory treatment.

In the drawings a supporting framework is seen, consisting of a pair of iron pillows 10, one at each side, joined by transverse tie rods 10', which pillows elevate the mechanism a little above the shelf or top 11 of the table whose top framework 12 is supported by legs 13, the whole being a support for the dough forming mechanism hereinafter to be described. It is one feature that the mechanism is readily transportable about a shop, notwithstanding its weight, so that it can be used close at hand to where the supply is or close to where its product is wanted, being moved from one place to another at will. To that end a pair of wheels 14 are provided, each at the base of one of the legs, having their peripheries tangent to the plane which passes through the bottom ends of the legs 13, and having their treads where contact with the floor is made in a line outside of the area delimited by the four legs although close to one pair of them. Coöperating with these and located in the top frame 12 on the side remote from the wheels are two rods 15, one at each side of the machine, passing horizontally through holes therein, slidable horizontally in said holes and joined at their outer ends by a cross bar 16. The bar 16 is preferably integral with the two side rods 15, thus keeping them rigidly in parallelism to each other and serving as a handle for pushing them both in together or pulling them out together through the holes in the frame 12. When pushed in these parts occupy the positions illustrated in Figs. 1 and 2. They can be drawn out from the frame, toward the left in those figures, until stopped by the lugs 17; and when so drawn out they with the frame of the machine constitute a lever having a relatively long arm from the bar 16 to the place where the wheels 14 make contact with the floor as a fulcrum, long enough so that a man is able thereby to lift the whole apparatus, it swinging about the fulcrum at the tread of wheels 14 and thus causing the bottom ends of legs 13 to clear the floor, even those legs which are close to the wheels. In this relation it can be trundled on wheels 14 to any desired position. When put down however, it stands firmly on the four legs 13. The lever arm can be put out of the way if desired by pushing the part 16 in toward the machine, with the rods 15 sliding in under the machine into the frame 12. On the other hand, for some uses of the machine it is desired to have a shelf at this end, which is herein called the front of the machine, particularly for holding a tray to receive a product of the machine. In such cases the parts 15, 16, 15, when left extended, serve as a shelf for holding such a tray.

In order further that the machine may be self-contained and portable to various parts of the shop, an electric motor 18 which has a switch 19, with suitable electrical connections not shown is illustrated as mounted under the frame 12, connected by a driving belt to a pulley 20 whence by another pulley and belt power is transmitted with reduction of speed to the pulley 20', which is the local driving wheel of the apparatus next to be described.

Figure 2:
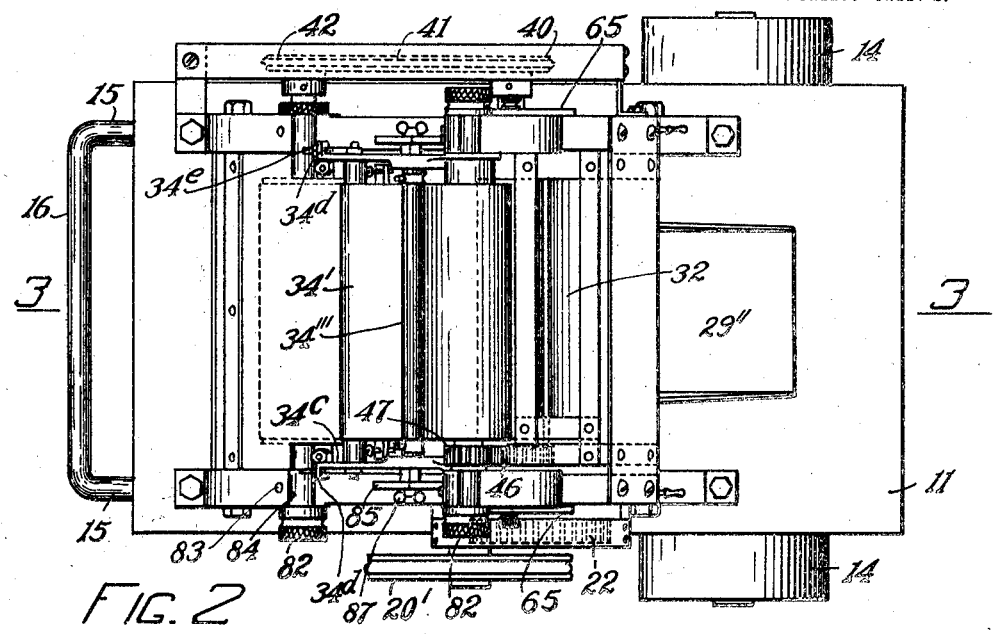
Fig. 2 is a plan of the same.
Figure 3:
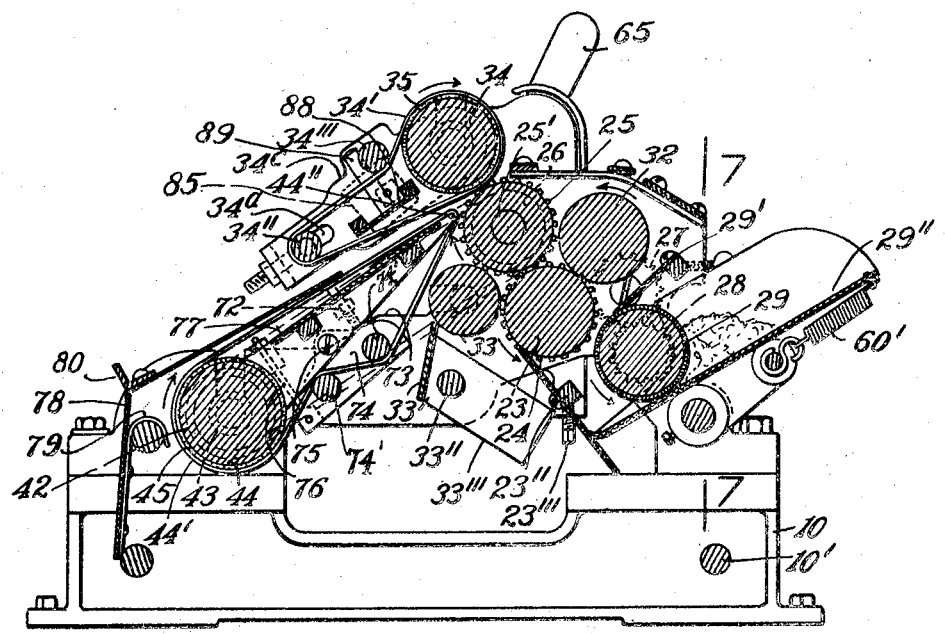
Fig. 3 is a side elevation of the top of the machine, on a larger scale and in section on the line 3—3 of Fig. 2.

The winding mechanism comprises an adjustable arrangement of rolls, bands and incidental appliances which are perhaps best seen in Fig. 3, reference being first made to Fig. 1 for the driving connections. On the shaft with the driving pulley 20' is a spur gear 21. This meshes with a spur gear 22 which, being larger, provides for still further reduction of speed from the original source of power, and which as seen in Fig. 7 has a bearing in side members 30 of the adjacent part of the machine frame. This gear 22 is on the same shaft with a roll 23, extending across the machine and having a smooth metal surface adapted to engage the dough, and having at its farther end a gear 24 whose cogs, as seen in Fig. 3, engage the cogs 25 through which all of the other mechanism about roll 23 and also that above it is driven; and also engage an idler gear 27 which, meshing with gear 28, drives roll 29 and actuates other mechanism to the right. The shaft 25', carries the smooth metal roll 26, and it extends outboard at the farther side of the machine and there carries a sprocket wheel 40 driving a chain 41 which meshes in a sprocket wheel 42 in the forward part of the machine on the shaft 43 which carries a roll 44 covered with sandpaper 45 and adapted to engage and drive a canvas belt or endless band 44' which passes around the roll 44 and goes thence backward and upward at an incline of about 30° to and around a guide rod 44" of rather small radius of curvature, adjustably located rather close to the forward side of roll 26, as well seen in Figs. 3 and 9. This band is substantially as broad as the rolls are long. The guide rod 44" is parallel to the surface of the roll 26, and far enough from it for the sheet of dough hereinafter described to pass between it and the roll 26 without touching it. The direction of motion of the band, as driven by the roller 44 and sprocket chain 41 is such that, when the forward side of the roll 26 is moving upward, the adjacent side of the band 44' passing around the rear side of the guide rod 44" is moving downward, and the top part of the band is moving up its incline toward said guide rod and thus backward toward the roll 26. On the near end of the shaft 25', being the portion removed in Fig. 3 but seen in Fig. 1, a gear 25" drives an idler 46 above it which drives a gear 47 on shaft 48 carrying roll 34, which is coated with sandpaper 35 around which passes another endless band 34', which also goes around an idler roll 34" and is subject to the action of a tension roll 34'''. This band is preferably made of felt, is of substantially the same width as roll 26 and on the under side of roll 34 is so closely adjacent to it, that dough cannot pass between it and the roll 26. At the line where they are nearest together these two are moving in opposite directions. The pintles on the ends of roll 34" pass through slots 34ª in a light frame which is movable separately from the rest of the machine, and through blocks 34ᵇ held on that frame, in which blocks the pintles have bearings. Said frame is composed of side plates 34ᶜ (Figs. 1, 3, 6) mounted loosely on the bushing 81 of shaft 48 and projecting forward therefrom and carrying the roll 34''' in bearings so situated that this roll causes the band 34' to cover about two-thirds or more of the circumference of the roll 34. At its forward end these side plates have ears 34ᵈ, (Fig. 2) through which pass screws 34ᵉ, projecting from said bearing blocks through the ears and carrying nuts on the outside. By means of these nuts the screws can be drawn upward, thus drawing the bearing blocks upward, and so drawing the roll 34'' and making the belt 34' tighter.

Figure 9:
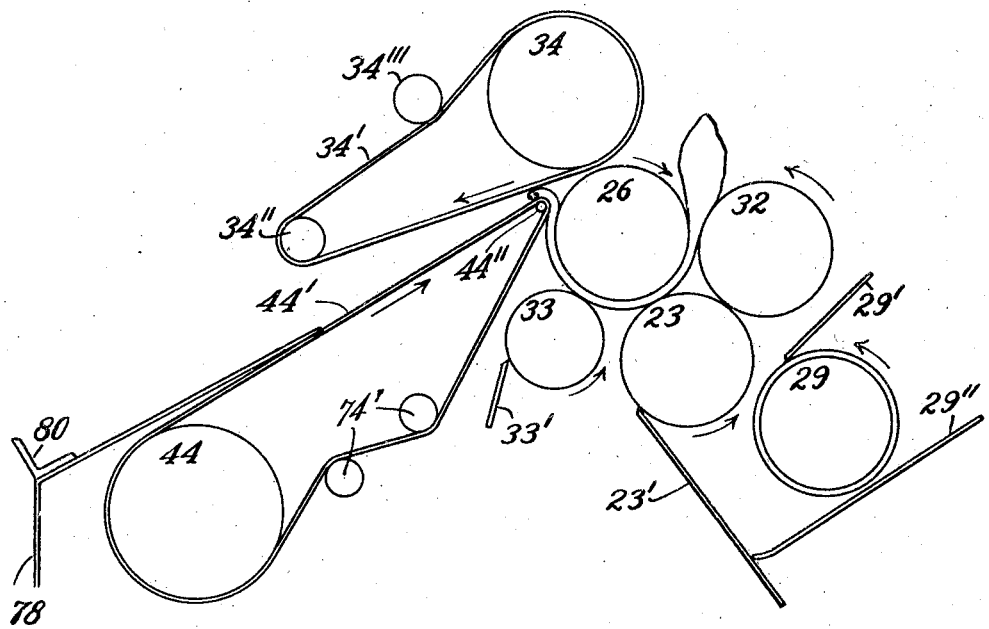
Fig. 9 is a diagrammatic representation of working parts of the machine.

The gear 25'' also drives a gear 50 on the shaft that bears the smooth metal roll 32, thus causing that roll, which is to the rear of and about level with the roll 26, to turn in the direction shown by the arrows in Figs. 3 and 9, with adjacent parts of rolls 26 and 32 moving the same way. Another roll, 33, of smooth metal, is located below the roll 26 and slightly forward of it, its gear through which it is driven being in mesh with the gear on shaft 25'.

The rolls 32, 23 and 33 are arranged in succession around roll 26 at a little distance from it, according to the thickness which the dough is to have previous to its being rolled into stick form, and all preferably have smooth metal surfaces. The belt 44' is preferably of canvas. The belt 34' is preferably of felt. The roll 29 is preferably covered with mohair plush or equivalent material having a pile. A drag plate 29' is fixed so that its edge dips a little below the surface of the pile of the plush, pointing in the direction in which the roll moves as seen clearly in Fig. 9, thus constituting a pile retractor. The rolls 23 and 33 have scraper plates 23' and 33', bearing upon their undersides, respectively, and pointing backward against the direction of rotation of those rolls. Dough which has been reduced to a certain thickness by passing between roll 26 and rolls 32, 23 and 33 can pass between the roll 26 and canvas belt 44' provided it adheres to the roll 26; but the belt 34' is close enough to roll 26 so that no dough on roll 26 can pass it. It therefore is stripped from the top of roll 26 and is carried forward in the machine by the forward moving underside of belt 34'. As it bends over forward it encounters the rearwardly moving upper side of canvas belt 44', and is then subject to the action of both belts, the upper tending to carry it forward and the under tending to carry it backward.

Figure 10:
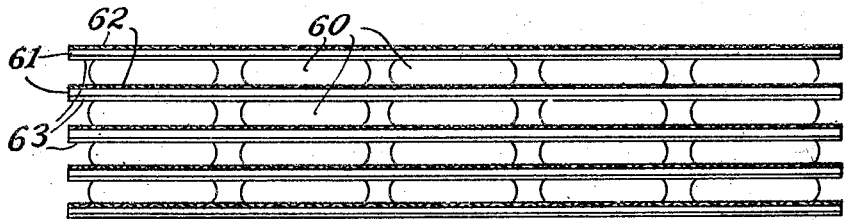
Fig. 10 is a somewhat diagrammatic representation of apparatus employed in preparing dough for action of the machine, in which for clearness the relative thickness of certain parts is exaggerated.

Co-acting with this arrangement of belts and rolls are other features of importance affecting their action upon the dough. Certain of these are illustrated in Fig. 10 where masses of dough 60 are represented piled in layers separated by trays having certain peculiar characteristics. These trays may be made of various materials, but are illustrated as made of wood 61 with a lining of belt or canvas 62 on one side and of tin 63 on the other side. While they may be of any convenient or suitable size I have found dimensions of about 18 by 24 or 18 by 36 inches convenient, each tray of this size being capable of holding three dozen balls of dough more or less according to size of each ball of dough as they come from the rounding machine of suitable size for crescent rolls. All of the trays are arranged with their tin sides bare and their felt sides well dusted with flour and facing the same way, preferably upward, but whether up or down being really immaterial so long as they all face alike. When a stack of suitable height, for example, alternate balls and trays about five to ten trays deep, has been completed and has been left for a short time, the balls flatten out owing to their autogenous pressure, and proofing of the dough. During half of the time the pile is inverted so that the pressure upon all of the balls is equalized over the whole period. In the particular case which is being described the resulting thickness is preferably about ⅜ of an inch, making oval disks of dough three inches more or less in diameter, according to weight of each piece of dough. The result of the operation is not only the deforming of the balls by flattening them by static pressure, as described, but the provision of a dry surface and a wet surface on each flattened ball, the surface next to the felt being dry and non-adhesive, and that next to the tin being wet and somewhat sticky. This characteristic of diverse surfaces against which the dough bears is carried through the mechanism already described, notwithstanding the similarity of surfaces of the rolls, the roll 26 being that to which the sticky side of the dough is presented, which was against the tin 63, and the rolls 32, 23, 33, and the belt 44' being surfaces against which the dry and non-adhesive side of the dough is presented, which was in the stack against the felt 62. Consequently, when the operator takes in hand one of the dough disks 60 and, with his hands at one edge of it, holding with his fingers, inserts the opposite edge between the rolls 26 and 32 with the sticky side against the roll 26, the dough is drawn forward by those rolls and adheres to the roll 26 after passing between the two, and also adheres to the roll 26 after passing between it and the roll 23, and still adheres to the roll 26 after passing between it and the roll 33. This is owing to the non-adhesive character of the side which is presented to the rolls 32, 23, 33, and the non-adhesive character of the surfaces of those rolls. This result is brought about as follows: In and of themselves said rolls may be no different from the roll 26, all having smooth polished metal surfaces, but the roll 29 and its mohair plush surface and the drag plate 29' thereon coöperate with a feeding hopper 29'' containing flour to maintain the non-adhesive condition of the rolls which surround the roll 26. The hopper 29'' is arranged at an incline toward the roll 29, which forms a bottom for it, and as the roll moves in the direction of the arrow, flour is picked up from the mass as seen in Fig. 3 and carried along on the pile of the plush. As successive portions of this plush roll pass the drag plate 29' the individual hairs of the plush pile are bent backward by that plate, until they pass its edge when by their inherent elasticity they spring forward. In the sudden motion of springing forward flour picked up from the mass and carried on the hairs and in the interstices between them is snapped off and is thrown forward in a fine spray upon the rolls 23 and 32. Some of that which strikes roll 23 is promptly transferred to roll 32 in passing where these two are nearly tangent to each other with their surfaces moving in opposite directions. Such as is thus acquired by the roll 32 and such as remains on the roll 23 make the adhesion of dough to the roll 26 relatively so much stronger than its adhesion to the rolls 32 and 23 that the dough follows around on the surface of the roll 26 and leaves the other two. The flour thus deposited on the outer surface of the dough is sufficient to prevent adhesion to the roll 33. Both of the rolls last mentioned are kept clean from any considerable adhesion of particles of dough by scrapers respectively marked 23' and 33'. The former as seen in Fig. 3 is mounted rigidly on a square rod 23" extending across the machine parallel to the roll. At the ends of this rod are pintles, on which the scraper can be adjusted by a set screw 23''' holding it. The scraper 33' is mounted on a lever-like swinging frame 33''' pivoted at each side at 33'', the scraper being at one end of the arm of the lever and the other end of the frame beyond the fulcrum 33'' having a sufficient weight of metal as seen in Fig. 3. The position of the roll 33 being movable, as hereinafter explained, the weighted lever support for the scraper 33' permits that scraper to bear automatically upon the surface of the roll 33 whatever be its position of adjustment. The continuity of feed of flour to the plush surface 29 is insured by an arrangement illustrated in part in Fig. 3 and in part in Fig. 7 consisting of the spring 60', a cam-like arrangement of one side 29''' of the hopper and a pin 61' on the roll 29 and adapted to engage this cam side of the hopper. During the course of each rotation the pin 61' rises beside the flaring side of the hopper as seen in Fig. 7, clearing the bottom portion of the side but rubbing against the upper portion and displacing the hopper sidewise a little by tipping it toward the right in Fig. 7, away from the eye in Fig. 3, until the pin 61' has ridden past the side 29''' whereupon the hopper snaps back under influence of the spring 60'. There should be a pin 61 at each side of the hopper, set on opposite sides of the roll 29 so that the snap-back occurs alternately in opposite directions. Thus at each rotation of the roll 29 the hopper is violently jarred so that flour is shaken down along its inclined surface to the plush 29 where it is unvaryingly picked up by the pile so as to be snapped off by the drag plate 29' and sprayed.

It is one feature of the invention that the distance of the roll 33 from the roll 26 can be adjusted so as to handle masses of dough of different sizes and of different thicknesses, according to the purpose or desire of the baker. One arrangement of these rolls is illustrated in Fig. 4, although for the small sized crescent rolls, whose manufacture is particularly being here described, or for some other varieties of plastic material the rolls need not be as widely separated as there portrayed. Ordinarily no occasion exists for making any difference in the relative positions of rolls 32 and 26 and 23 which perform a preliminary operation of thinning the dough; but means is provided for regulating the final thickness of the dough as determined by the distance apart of the surfaces of rolls 33 and 26. This consists in provision for moving the roll 33. As illustrated in Figs. 4 and 5, a handle 65 is provided pivoted to the frame at 66 and capable of a slight movement about said pivot which brings the roll 33 toward or from the roll 26. The handle 65 may be fastened in either of several positions by a screw 67 which may be inserted through either of the holes 68 in the handle into either of corresponding holes 69 in the frame of this part of the machine. When so inserted this screw and the pivot 66 hold the handle 65 and thus determine the position of the bearing 70 of the roll 33. Said bearing is a bushing in which the shaft of the roll 33 turns, the bushing being rigid in relation to the handle 65 and movable thereon within a slot 71 in the side frame of the machine seen in Fig. 4. Upon removal of the pivot screw 66 and the screw 67, and removal of the handle and bushing 65 and 70 by drawing them to the left in Fig. 5, the shaft carrying the roll 33 can be slipped out sidewise of the roll, toward the front of the machine, through the slot 71 as seen in Fig. 4. Notwithstanding the fact that the adjusting movement of the gear driving the roll 33 is not about the center of the gear on shaft 25' with which it is in mesh, the requisite movement is so slight that it works satisfactorily in either of its adjusted positions; and consequently the roll 33 thus determines the thickness of the sheet of dough which is to be wound upon itself to form the spiral of the crescent roll. Provision is also made for adjustmnet of the positions of the canvas belt 44' and the felt belt 34'. The former, 44', at its inmost reach must be far enough away from the roll 26 so that a sheet of dough clinging to the surface of the roll 26, and of thickness determined by the position of roll 33, can pass it without touching it. This adjustment is effected by providing for swinging the frame on which the band 44' is carried. The shaft 43, which carries the driving roll 44 of this belt, has a bushing 81 at each end. Side plates 43'' with holes into which the bushings fit loosely extend thence upward to the cross rod 44'', which joins their upper ends. Thus a rectangular frame is formed consisting of the side plates joined at their pointed upper ends by the rod 44'' and at their broader lower ends by the shaft 43, and able to swing pivotally somewhat around the bushing within which the shaft 43 turns. In an ordinary machine, this swinging need only be so that the rod 44'' may be set in varying proximity to the roll 26 or to the felt band 34'. A screw 72 adjustable on each side plate 43'' and engaging a stationary part 73 on the side frame of the machine determines the elevation at which the side plates 43'' and therefore the cross rod 44'' stand, when the screws are resting down on their supports 73 by gravity. Means is provided for tightening the canvas belt 44' consisting of a sub-frame having side plates 74 pivoted to the main side plates 43'' at 75, Fig. 3, at a position not in the line of the belt and adjustable as swung about said pivot by an adjusting screw 76 on said sub-frame engaging between it and said side plate 43''. This sub-frame carries two small rods, 74', plainly seen in Fig. 3, which engage the canvas band on opposite sides so that when they are swung to the right in Fig. 3 they loosen the tension of the band and when swung to the left they tighten it. This adjustment is effected to any desired degree by means of the screws 76. Within this movable frame 43, 44, is supported a plate 77 close under the top reach of the belt 44' affording a firm support for that part of its surface which is just below the rod 44'' so that this belt does not sag appreciably while dough is being rolled thereon. Covering the lower part of this frame and of the top reach of the belt 44' is a plate 78, hung on a cross rod by a hook 79 and having a ledge 80 to receive the finished rolls of dough. The upper portion of the plate 78 serves to separate the descending roll of dough from the upwardly moving belt 44' and to substitute for it a smooth incline down which the roll may roll after being made on the upper part of the belt 44'. The bushings 81 in which shaft 43 is mounted are similar to those which are fully illustrated in Figs. 4 and 6 with respect to the shaft 48. They consist of cylindrical pieces axially bored to receive the shaft, fitting endwise into holes through the side frame but having partly knurled flanged heads 82 too large to enter, and held fixed in place by set screws 83. To remove the shaft it is only necessary to loosen the set screw 83, pull the bushing out endwise, and then to extract the shaft, sidewise with respect to the axis, through the slot 84. The shaft 48 driving the felt belt 34' is likewise mounted removably; and the frame holding this belt 34' can swing like the other frame around the bushings 81 of its driving shaft as a bearing. Normally it rests by gravity at a variable elevation determined by side props 85 supported on the frame of the machine. These side props are preferably simple square plates of metal, the shape of which is best seen in Figs. 1, 2 and 3, adapted to bear against a ledge 86 on the frame and set eccentrically as clearly seen in Fig. 1. The plate is rotatable about the axis of a clamping thumb screw 87 to put either of its four edges downward, each edge being at a different distance from the axis. Another way of accomplishing this same result is illustrated in Fig. 8 where the part 85' serves the function of the simpler shaped part 85 of Figs. 1 and 3. Extending through the frame holding belt 34' from one side to the other is a plate 88 which serves the double purpose of stiffening the frame and of providing a backing for the under part of the belt 34' in case that belt should be too slack when the roll of dough is forming under it. Round posts 89 serve to guide this belt and hold it within the proper limits. The adjustment of the eccentric side supports 85 or 85' fixes the distance of the belt 34' from the belt 44' but does not affect the distance of the belt from the surface of roll 26 as the movement in adjusting it is about the axis of roll 34. This distance is fixed so that the felt belt 34' passes always close enough to the roll 26 to draw off therefrom any sheet of dough which is adhering thereto. It does this with greater readiness and certainty because of the superiorly adhesive character of its felt surface as compared with the smooth surface of the roll 26 to which the dough has been adhering by virtue of the relative stickiness of the side of the roll which is toward that roll as compared with the side which is toward the rolls 32, 23 and 33. When the dough is stripped from the roll 26 and carried forward by the felt belt 34' its drooping head rubs against the backward moving canvas belt 44' underneath it; but the former works on its sticky side and is of superior adhesive characteristic while the latter works more or less on its floured and dry side and is also of inferior adhesive power. The proximity of the belts to each other is such that the leading end of each sheet of dough is pulled forward on top and backward underneath producing a rolling action with the outward rolling predominating. The belt 34' moves materially faster than the roll 26, as seen by the gearing in Fig. 1, and the belt 44' also moves faster, so that the dough is perfectly cleared away from the space between the two belts and the roll 26, and is itself formed into a roll because its retarded underside is carried relatively backward and engages the forward moving adjacent part of the dough sheet and is carried forward by it again, with the general result that the sheet of dough is wound upon itself in spiral form between the two belts 44' and 34'. Those belts yield as much as is necessary and incidentally get a firmer grip on the roll of dough as it comes by them, because enveloping it more completely. The belt 44' at this point is firmly supported by the plate 77, but the belt 34' can yield upward more or less and thus encircles more of the dough, while still resting down on the ledge 86; and in case the size of the dough roll is sufficient it can easily rise above that, swinging upward as above described about the axis of roll 34, and falling again as soon as the dough roll has passed out. The relatively greater adhesive power of the felt surface than the canvas helps in this action, particularly in starting the winding or rolling action, and by preventing the dough from being carried back or down too much where the latter goes down from rod 44'; and the movement of the under belt backward delays the forward travel of the roll of dough that is being formed.

In the general operation of the machine the rolls rotate in the various directions indicated in Fig. 9. The workman, taking a flattened ball of dough from one of the trays on which it has been deformed by autogenous pressure as indicated in Fig. 10, inserts one edge of the disk of dough between the rolls 26 and 32. Holding back the body of the disk he allows the machine to draw the leading part forward. Incidentally it is deformed further, being thinned according to the distance of the roll 26 from rolls 32, 23, and 33; and being drawn out to somewhat of a pear shape by the retention of hold of the workman's fingers on one edge. Adherence of the dough to roll 26 is aided by the flour spraying action of the drag on the plush pile, which keeps its outer surface non-adhesive while its inner surface is adhesive because of the non-drying effect of the roll 26 and of the thinned surface 63 which preceded it in contact with this side of the dough. Next the dough is stripped from the roll 26 by the superiorly adhesive felt belt 34' and is rolled and pulled forward by the same, while its underside is retarded and rolled by the interiorly adhesive canvas belt 44', until it has reached the plate 78, after which it is quickly discharged from the machine to the receiving ledge or to any other means provided to receive it. Meanwhile flour is kept abundantly supplied to the roll 29 by the lateral jarring of the hopper 29'', by alternate action of pin 61' on the cam-like side of the hopper and of the snapping back action of the spring 60'.

The process in which the described mechanism plays a part has the important characteristic that the dough is made to adhere to the central roll as a carrier, it having been customary heretofore for dough handling mechanism to be prepared with scrapers, and the dough itself, by dusting, so that the dough does not adhere to a roll on either side. In the present case the adhesion is provided by making the surface of the dough somewhat wet which is to come into contact with the central or carrier roll; and this is accomplished automatically, together with a certain refinement of the texture and a re-shaping of the dough from ball to disk shape, by the simple process of stacking the dough in a certain way when it comes from the divider or from the rounding machine. The balls or lumps, deposited or put on the dusted canvas side of a tray, are covered by a tray laid upon them with its tinned side down, upon whose upper canvas side more lumps or balls are placed. While the stack is being made proofing goes on. The dough sweats against the tin, becoming moist; and it becomes flat because of the weight piled upon it; and its grain becomes fine because the continuous static pressure keeps the bubbles small. The weight and the lapse of time while the stack is being piled is sufficient to complete the process as regards the bottom layer. The stack can be immediately turned over and the passing of the disks through the forming machine begun. The weight of those remaining above, and the lapse of time while a particular layer is being reached, are sufficient to produce these three effects for each lump. The dough thus prepared is wet enough on one side to adhere to the central carrier roll, and dry enough on its other side so that it does not adhere to the surrounding thinning rolls. These surrounding rolls may travel at a surface speed equal to the surface speed of the central roll and hence they do not either draw or delay the dough, but have a thinning and spreading effect upon the dough disks. The number of turns in the curling can be controlled somewhat by the workman. Holding the edge of the disk in his fingers a longer or shorter time causes it to be strung out more or less. The stack of trays between which the dough disks are formed may rest on the frame 15, 16, when drawn out, and that frame may be used as a lever for raising the whole machine to move it and its load, on wheels 14, from the vicinity of the dividing machine to the place where the curled rolls are wanted.

I claim as my invention:—

1. Apparatus for working on plastic material including two moving belts adapted to curl and roll a sheet of the material between them; one of said belts being arranged and adapted to engage the leading edge of the sheet and to bend it over into contact with the second belt and to roll it thereon away from the place of engagement; and the said second belt moving less rapidly and in the opposite direction to a point close to said place of engagement.

2. Apparatus for working on plastic material including two moving belts adapted to curl and roll a sheet of the material between them; one of said belts being arranged and adapted to engage the leading edge of the sheet and to bend it over into contact with the second belt and to roll it thereon away from the place of engagement; and the said second belt moving less rapidly and in the opposite direction to a point close to said place of engagement; one of said belts being unyielding and the other yielding as the roll grows in size.

3. Apparatus for working on plastic material including two moving belts adapted to curl and roll a sheet of the material between them; one of said belts having a surface adapted to adhere readily to the material and being arranged and adapted to engage the leading edge of the sheet and to bend it over into contact with the second belt and to roll it thereon away from the place of engagement; and the said second belt having a surface adapted to adhere less readily to the material and moving less rapidly and in the opposite direction to a point close to said place of engagement.

4. Apparatus for working on plastic material including two moving belts adapted to curl and roll a sheet of the material between them; one of said belts being of felt and arranged and adapted to engage the leading edge of the sheet and to bend it over into contact with the second belt and to roll it thereon away from the place of engagement; and the said second belt being of canvas and moving less rapidly and in the opposite direction to a point close to said place of engagement.

5. Apparatus for handling plastic material, having in combination rolls for compressing a lump to sheet form, and means continuously operative to render the rolls on one side of the sheet non-adhesive.

6. Apparatus for handling plastic material, having in combination rolls for compressing a lump to sheet form, and means continuously operative to render the rolls on one side of the sheet non-adhesive, consisting of a hopper for holding a powder; a cylinder having a pile surface, turning therein; and a retractor engaging the pile as the cylinder turns, whereby the pile, upon release from the retractor, throws powder as a spray.

7. Apparatus for handling plastic material, having in combination rolls for compressing a lump to sheet form, and means continuously operative to render the rolls on one side of the sheet non-adhesive comprising a hopper adapted to hold a powder, a spraying device therein, and means to agitate the hopper.

8. Apparatus for handling plastic material, having in combination rolls for compressing a lump to sheet form, and means continuously operative to render the rolls on one side of the sheet non-adhesive, comprising a hopper, a spraying device therein, elastic means tending to hold the hopper against a fixed support, and an element periodically displacing the hopper therefrom and suddenly releasing it, whereby it is jarred upon its being returned by said elastic means.

9. Apparatus for working on plastic material comprising a roll, surrounding rolls adapted to thin material passing around the first roll; means to prevent the material from adhering to the said surrounding rolls; a belt passing close to the inner roll and adapted to strip it of material; and a retarding and supporting surface for the stripped material, comprising a belt moving less rapidly and oppositely as compared with the first mentioned belt, the two belts being adapted to curl and hold the material in compression between them.

10. Apparatus for working on plastic material, comprising a roll; surrounding rolls adapted to thin material passing around it; and two belts with space between them adapted to receive material from said roll, inclined downward from the upper part of said roll, with the upper belt moving downward and adapted to strip the material from said roll and the lower belt moving upward less rapidly.

11. Apparatus for working on plastic material, comprising a roll; surrounding rolls adapted to thin material passing around it; and two belts with space between them adapted to receive material from said roll, inclined downward from the upper part of said roll, with the upper belt moving downward and adapted to strip the material from said roll and the lower belt moving upward less rapidly; and guiding pulleys around which said belts travel having sandpaper surfaces for engaging said belts.

12. Apparatus for working on plastic material, comprising a roll; surrounding rolls adapted to thin material, passing around it; means gearing all of the rolls together so that their adjacent surfaces run at a common speed; means to set the last of said surrounding rolls at different distances from the inner roll, without varying its speed ratio; and means to strip and curl the material that has passed between said rolls.

13. Apparatus for working on plastic material, comprising a roll; surrounding rolls adapted to thin material passing around it; means gearing all of the rolls together so that their adjacent surfaces run at a common speed; means to set the last of said surrounding rolls at different distances from the inner roll, without varying its speed ratio; and means to strip and curl the material that has passed between said rolls; the said setting means comprising a pivotally mounted support for the arbor of said last of the surrounding rolls and means to fix it in different positions about its said pivot, while its gear remains in mesh with its driving gear.

14. Apparatus for working on plastic material, comprising means to thin said material, a belt to curl the said material, and a roll driving said belt; combined with a frame for the machine and a bearing for the said roll removable from said frame in a direction endwise of the axis; the arbor of said roll being thereafter removable from the frame in a direction perpendicular to its said axis.

15. Apparatus for working on plastic material, comprising means to thin said material, a belt to curl the said material, and a roll driving said belt; combined with a frame for the machine; bushings set therein, holding the arbor of said roll; and means for holding said bushings in place; there being a slot extending from the hole wherein the bushing is set, large enough for extraction of the arbor, but not the bushing; the said bushing being removable endwise from said hole and arbor.

16. Apparatus for working on plastic material, comprising means to thin said material, a belt to curl the said material, and a roll driving said belt; combined with a frame for the machine; bushings set therein; holding the arbor of said roll, and means for holding said bushings in place; there being a slot extending from the hole wherein the bushing is set, large enough for extraction of the arbor, but not the bushing; the said bushing being removable endwise from said hole and arbor; an auxiliary frame pivoted on said bushing and extending thence in the direction of travel of said belt and supporting the remote end thereof, whereby the belt can swing laterally from its general direction of travel, as the material grows in size when curled.

17. Apparatus for working on plastic material, comprising rolls adapted to thin material; a belt for curling the thinned material; guide rolls and a supporting frame therefor, pivoted at the end where the belt receives material; and a plurality of struts of differing lengths fixed together and pivotally mounted for supporting said frame, whereby the initial position of the frame may be predeterminately set at various angles.

18. Apparatus for working on plastic material, comprising rolls adapted to thin material; a belt for curling the thinned material; a coöperating oppositely moving belt on which the material lies while being curled; a frame supporting said oppositely moving belt, having a driving roll and a guide of small diameter around which the belt passes, the said guide being between the other belt and the thinning roll; and a support holding said guide at a variable distance from said thinning roll, there being a frame supporting said guide and pivoted on the axis of said driving roll.

19. Apparatus for working on plastic material, comprising rolls adapted to thin material; a belt for curling the thinned material; a coöperating oppositely moving belt on which the material lies while being curled; a frame supporting said oppositely moving belt, having a driving roll and a guide of small diameter around which the belt passes, the said guide being between the other belt and the thinning roll; a sub-frame pivoted thereon having supporting rolls on opposite sides of the belt; and means for fastening said sub-frame in various angles about said pivot.

Signed by me at Boston, Massachusetts, this 16th day of August, 1917.

GUNTHER H. PETRI.